(12) United States Patent
Ishikawa

(10) Patent No.: US 10,574,837 B2
(45) Date of Patent: Feb. 25, 2020

(54) INFORMATION PROCESSING APPARATUS FOR DATA COMMUNICATION WITH EXTERNAL APPARATUS AND CONTROL METHOD FOR THE SAME, AND STORAGE MEDIUM

(71) Applicant: CANON KABUSHIKI KAISHA, Tokyo (JP)

(72) Inventor: Akira Ishikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/114,384

(22) Filed: Aug. 28, 2018

(65) Prior Publication Data
US 2019/0068799 A1 Feb. 28, 2019

(30) Foreign Application Priority Data
Aug. 31, 2017 (JP) .................................. 2017-167362

(51) Int. Cl.
*G06F 3/12* (2006.01)
*H04N 1/00* (2006.01)
*H04L 29/12* (2006.01)

(52) U.S. Cl.
CPC ....... *H04N 1/0022* (2013.01); *H04L 61/2015* (2013.01); *H04L 61/2061* (2013.01)

(58) Field of Classification Search
CPC .............. H04N 1/0022; H04N 1/00244; H04L 61/2015; H04L 61/2061; H04L 61/2076
See application file for complete search history.

(56) References Cited

U.S. PATENT DOCUMENTS

2014/0122680 A1* 5/2014 Okamoto .............. H04L 61/106 709/223

FOREIGN PATENT DOCUMENTS

JP 2003319461 A 11/2003

* cited by examiner

*Primary Examiner* — Moustapha Diaby
(74) *Attorney, Agent, or Firm* — Rossi, Kimms & McDowell LLP

(57) ABSTRACT

An information processing apparatus capable of preventing trouble from occurring in communication setting due to respective different DHCP servers connected to lines. The information processing apparatus makes a request to the respective DHCP servers connected to a first line and a second line, for a plurality of types of option data required in communication setting of the information processing apparatus. The information processing apparatus makes no request to the DHCP server connected to either the first line or the second line, for a type of option data not required to have a unique value set for each of the first line and the second line, from the types of option data.

8 Claims, 17 Drawing Sheets

*FIG. 15*

| OPTION NUMBER (1501) | CLASSIFICATION (1502) | DESCRIPTION |
|---|---|---|
| 1 | EACH LINE | SUBNET MASK |
| 3 | ONLY MAIN LINE | ROUTER |
| 6 | ONLY MAIN LINE | DNS SERVER |
| 12 | ONLY MAIN LINE | HOSTNAME |
| 15 | ONLY MAIN LINE | DOMAIN NAME |
| 44 | ONLY MAIN LINE | WINS SERVER |
| 69 | ONLY MAIN LINE | SMTP SERVER |
| 70 | ONLY MAIN LINE | POP SERVER |
| 120 | ONLY MAIN LINE | SIP SERVER |

*FIG. 20*

| OPTION NUMBER | CLASSIFICATION | DESCRIPTION |
|---|---|---|
| 22 | ONLY MAIN LINE | SIP SERVER |
| 23 | ONLY MAIN LINE | DNS SERVER |
| 24 | ONLY MAIN LINE | DOMAIN NAME |

INFORMATION PROCESSING APPARATUS FOR DATA COMMUNICATION WITH EXTERNAL APPARATUS AND CONTROL METHOD FOR THE SAME, AND STORAGE MEDIUM

BACKGROUND OF THE INVENTION

Field of the Invention

The present invention relates to an information processing apparatus and a control method for the information processing apparatus, and a storage medium.

Description of the Related Art

A multifunction peripheral (MFP) has been known as an information processing apparatus that performs data communication with an external apparatus included in a local area network (LAN). The MFP is set with an IP address for specifying the MFP on the LAN. The external apparatus specifies the IP address for the MFP to perform data communication with the MFP (e.g., refer to Japanese Laid-Open Patent Publication (kokai) No. 2003-319461). A DHCP server connected to the LAN assigns an IP address to the MFP, so that the MFP sets the assigned IP address as the IP address for the MFP. In addition to the IP address, the MFP acquires a plurality of types of option data, such as a subnet mask corresponding to the IP address and address information on an SMTP server, from the DHCP server, to perform communication setting of the MFP on the basis of the acquired option data.

In recent years, an MFP having a plurality of communication interfaces in order to perform data communication, has been developed. For such the MFP, it has been studied that a communication function with multiple lines available in divided networks based on uses is further provided in addition to a communication function with a single line as described above. An MFP having a communication function with multiple lines (hereinafter, referred to as a "multiple-line MFP") sets respective IP addresses acquired from different DHCP severs connected to the lines, as the IP addresses of the lines. The multiple-line MFP performs communication setting of the MFP, on the basis of option data acquired from the DHCP servers.

However, when the different DHCP servers are connected to the lines as in the multiple-line MFP described above, trouble may occur in the communication setting. For example, when option data, such as address information on an SMTP-server, that is not required to have a unique value set for each line, is provided together with a different value from the DHCP server of each line, the MFP cannot determine which one of a plurality of pieces of address information on different SMTP servers is to be set. As a result, trouble occurs in which the address information on an appropriate SMTP server cannot be set in the communication setting.

SUMMARY OF THE INVENTION

The present invention provides an information processing apparatus capable of preventing trouble from occurring in communication setting due to respective different DHCP servers connected to lines and a control method for the information processing apparatus, and a storage medium.

Accordingly, the present invention provides an information processing apparatus having a first line and a second line employing a network different from a network of the first line, the first line and the second line being connected to respective different DHCP servers, the information processing apparatus comprising, an option-data requesting unit configured to make a request to the respective DHCP servers connected to the first line and the second line, for a plurality of types of option data required in communication setting of the information processing apparatus, wherein the option-data requesting unit makes no request to the DHCP server connected to either the first line or the second line, for a type of option data not required to have a unique value set for each of the first line and the second line, from the types of option data.

According to the present invention, the trouble can be prevented from occurring in the communication setting due to the respective different DHCP servers connected to the lines.

Further features of the present invention will become apparent from the following description of exemplary embodiments (with reference to the attached drawings).

BRIEF DESCRIPTION OF THE DRAWINGS

FIG. 15 is a diagram showing an exemplary option table managed by the MFP in FIG. 1.

FIG. 20 is a diagram showing an exemplary option table managed by an MFP according to the second embodiment.

DESCRIPTION OF THE EMBODIMENTS

Embodiments of the present invention will be described in detail below with reference to the drawings. A case where an MFP as an information processing apparatus is applied with the present invention, will be described in the present embodiment, but the present invention is not limited to the MFP. Thus, for example, the present invention may be applied to a communication apparatus, such as a PC, having a plurality of lines.

Figure 1:
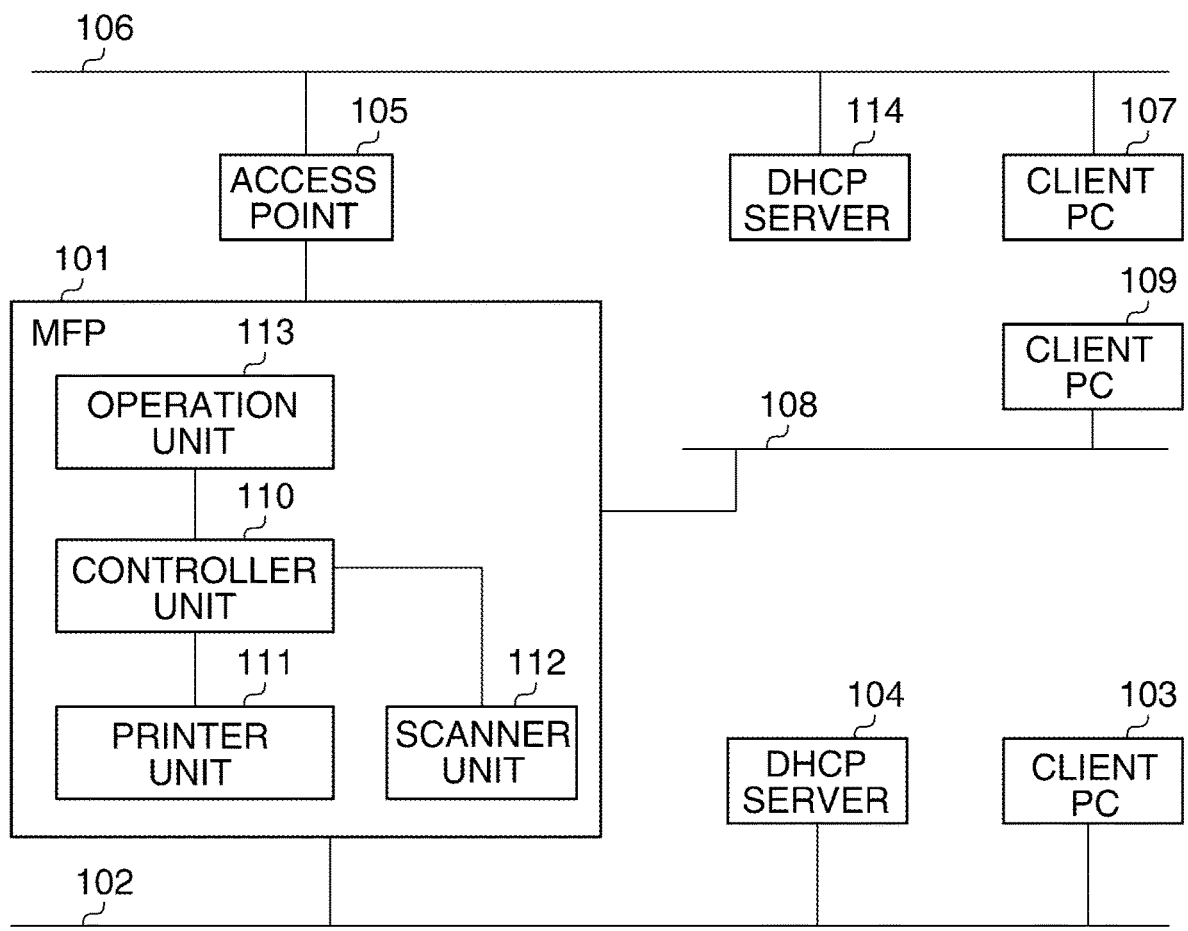
FIG. 1 is a schematic block diagram showing the configuration of an MFP as an information processing apparatus according to a first embodiment of the present invention.

FIG. 1 is a schematic block diagram showing the configuration of an MFP 101 as an information processing apparatus according to a first embodiment of the present invention. It should be noted that an IP address in IPv4 is used in the first embodiment.

In FIG. 1, the MFP 101 is connected to a client PC 103 as a communication apparatus and a dynamic host configuration protocol (DHCP) server 104 included in a LAN 102 in a wired infrastructure, through a wired cable not shown. The MFP 101 performs wired LAN communication with the client PC 103 and the DHCP server 104. The DHCP server 104 assigns an IP address to each of the MFP 101 and the client PC 103 in the LAN 102. For example, the client PC 103 specifies the IP address for the MFP 101 assigned by the DHCP server 104 and accesses the MFP 101 to start data communication with the MFP 101. The MFP 101 performs wireless LAN communication with a client PC 107 as a communication apparatus and a DHCP server 114 included in an LAN 106 in a wireless infrastructure, through an access point 105 connected in communication. The DHCP server 114 assigns an IP address to each of the MFP 101 and the client PC 107 in the LAN 106. Furthermore, the MFP 101 itself functions as an access point, to perform direct wireless communication with a client PC 109 as a communication apparatus included in a LAN 108.

The MFP 101 has a plurality of lines. It should be noted that an exemplary configuration of the MFP 101 having one main line and one sub-line will be described in the present embodiment. The MFP 101 is capable of operating in the wired infrastructure and the wireless infrastructure, simultaneously. The MFP 101 uses one of the wired infrastructure and the wireless infrastructure as the main line and the other as the sub-line.

Next, the configuration of the MFP 101 will be described. The MFP 101 includes a controller unit 110, a printer unit 111, a scanner unit 112, and an operation unit 113. The controller unit 110 is connected to the printer unit 111, the scanner unit 112, and the operation unit 113.

The MFP 101 is an image forming apparatus that performs image forming processing. The controller unit 110 controls the entire MFP 101 in a unificatory manner. The printer unit 111 performs printing processing, on the basis of print data received from a communication apparatus, such as the client PC 103, 107, or 109. The scanner unit 112 scans an original to generate image data. The operation unit 113 includes a display unit and a plurality of operation keys, not shown. For example, the operation unit 113 displays, onto the display unit, an operation screen for performing each item of setting for the MFP 101, and receives an instruction input by a user.

Figure 2:
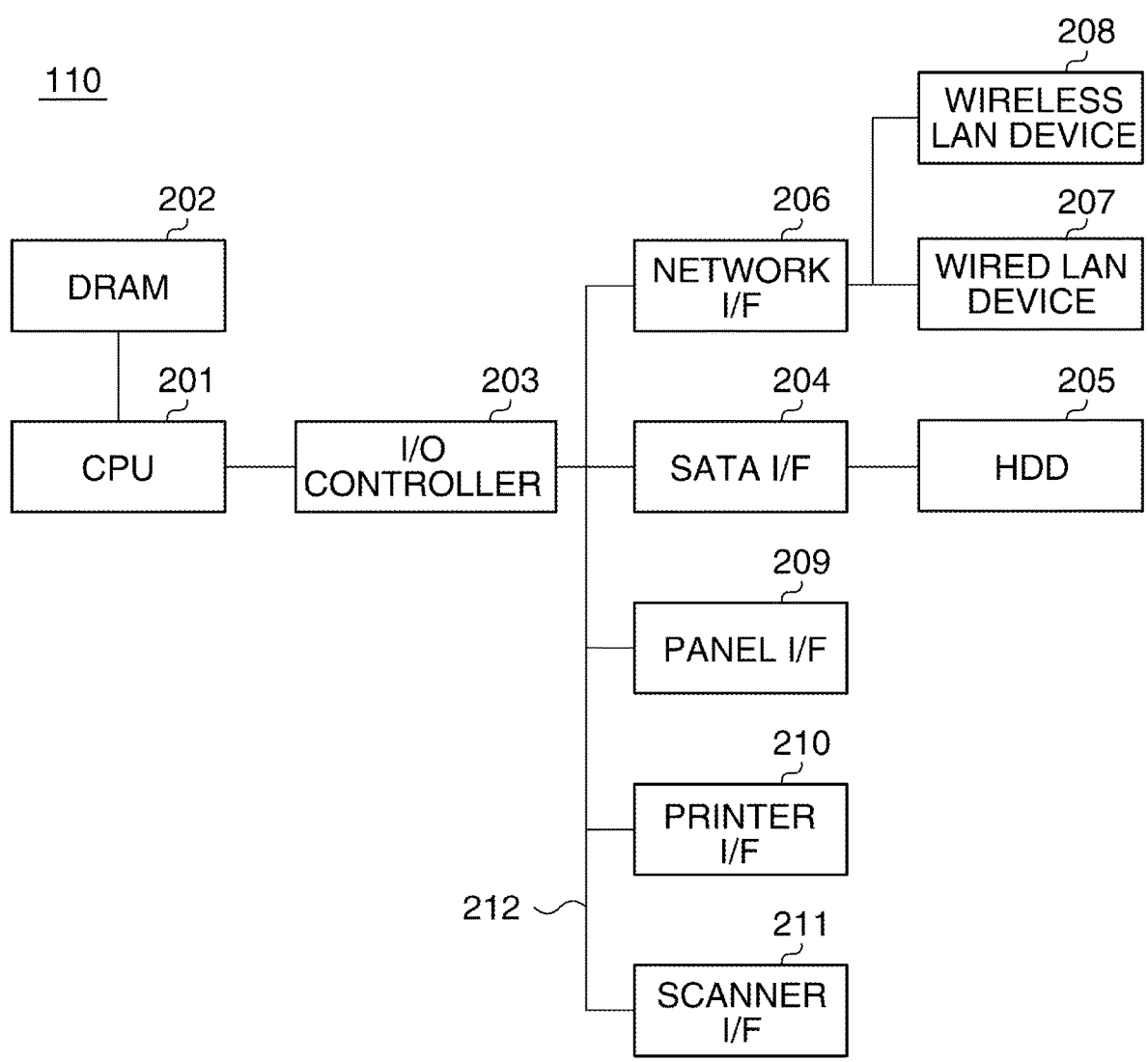
FIG. 2 is a schematic block diagram showing the configuration of a controller unit in FIG. 1.

FIG. 2 is a schematic block diagram showing the configuration of the controller unit 110 in FIG. 1.

In FIG. 2, the controller unit 110 includes a CPU 201, a DRAM 202, an I/O controller 203, a SATA I/F 204, an HDD 205, a network I/F 206, a wired LAN device 207, a wireless LAN device 208, a panel I/F 209, a printer I/F 210, and a scanner I/F 211. The CPU 201 is connected to the DRAM 202 and the I/O controller 203. The I/O controller 203, the SATA I/F 204, the network I/F 206, the panel I/F 209, the printer I/F 210, and the scanner I/F 211 are mutually connected through a bus 212. The SATA I/F 204 is connected to the HDD 205. The network I/F 206 is connected to the wired LAN device 207 and the wireless LAN device 208 each as a communication interface.

The CPU 201 performs computing processing for performance of each type of control in the controller unit 110, to transmit a control instruction to the I/O controller 203. The DRAM 202 is used as a work area for the CPU 201 and as a temporary storage area for each piece of data. The I/O controller 203 transfers the control instruction from the CPU 201 to each constituent element connected through the bus 212. The SATA I/F 204 controls writing of data into the HDD 205 or controls reading of data stored in the HDD 205, in accordance with the control instruction from the CPU 201. The HDD 205 stores a program for achieving each function of the MFP 101 and image data.

The network I/F 206 controls each of the wired LAN device 207 and the wireless LAN device 208, in accordance with the control instruction from the CPU 201. The wired LAN device 207 controls the wired LAN communication with the client PC 103 included in the LAN 102 in the wired infrastructure. The wireless LAN device 208 has a wireless infrastructure mode and a wireless access-point mode. In the wireless infrastructure mode, the wireless LAN communication is performed with the client PC 107 included in the LAN 106 in the wireless infrastructure, through the access point 105. In the wireless access-point mode, the MFP 101 functions as an access point to perform the direct wireless communication with the client PC 109 included in the LAN 108. Hereinafter, the wireless communication in the wireless access-point mode is defined as wireless direct.

The panel I/F 209 controls displaying in the operation unit 113, in accordance with the control instruction from the CPU 201. The panel IF 209 transfers the content of an instruction input in the operation unit 113, to the CPU 201. The printer I/F 210 causes the printer unit 111 to perform the printing processing, in accordance with the control instruction from the CPU 201. The scanner I/F 211 causes the scanner unit 112 to perform the scanning processing, in accordance with the control instruction from the CPU 201.

Figure 3:
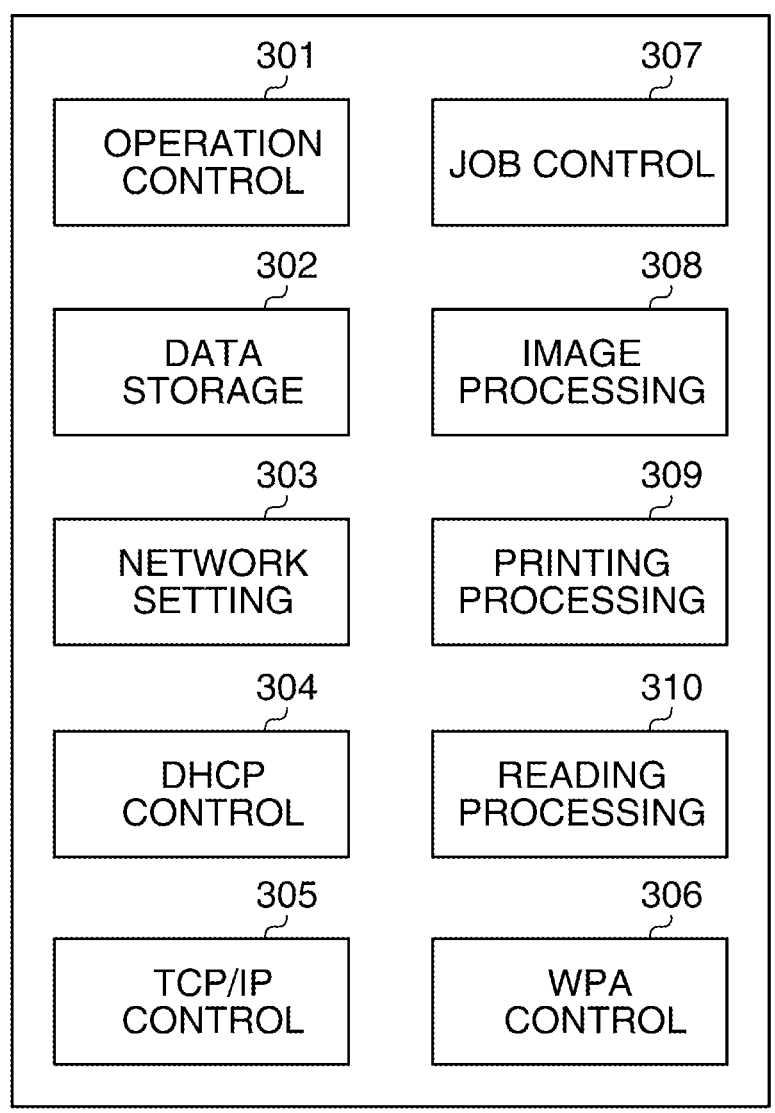
FIG. 3 is a schematic block diagram showing the configuration of a software module to be controlled by the controller unit in FIG. 1.

FIG. 3 is a schematic block diagram showing the configuration of a software module to be controlled by the controller unit 110 in FIG. 1.

In FIG. 3, the MFP 101 includes an operation control module 301, a data storage module 302, a network setting module 303, a DHCP control module 304, a TCP/IP control module 305, a Wi-Fi protected access (WPA) control module 306, a job control module 307, an image processing module 308, a printing processing module 309, and a reading processing module 310. The CPU 201 executes a program stored in the HDD 205, to control each module described above.

The operation control module 301 controls displaying of a screen in the operation unit 113. The operation control module 301 receives an operation of an operation screen or an operation key by the user. The data storage module 302 controls writing of data, such as a set value, into the HDD 205. The data storage module 302 controls reading of data stored in the HDD 205. The network setting module 303 makes a request to each of the DHCP control module 304 and the WPA control module 306 for processing, in order to perform control regarding network setting of the MFP 101. For example, in a case where the user sets the effect that the IP address assigned by the DHCP server 104 is to be used as address information on the MFP 101, the network setting module 303 makes a request to the DHCP control module 304 for processing. The DHCP control module 304 controls processing of assigning the IP address, in accordance with a protocol defined as DHCP in RFC 2131. The TCP/IP control module 305 performs processing of transmitting or receiving a network packet. When receiving the request from the network setting module 303, the WPA control module 306 performs wireless-access authentication processing based on a predetermined encryption scheme, for example, a WPA protocol. It should be noted that a case where a WPA-PSK encryption scheme is used in performance of the wireless LAN communication, will be described in the present embodiment, but the encryption scheme is not limited to this. For example, a different encryption scheme, such as WEP or WPA-EAP, may be provided. The encryption scheme is not necessarily used in the wireless LAN communication.

In order to perform control regarding execution of a job, the job control module 307 instructs each of the image processing module 308, the printing processing module 309, and the reading processing module 310, to perform processing related to the job. When receiving the instruction for performance from the job control module 307, the image processing module 308 performs image processing. In the image processing, for example, the image processing module 308 processes image data into a data format appropriate for each use. When receiving the instruction for performance from the job control module 307, the printing processing module 309 controls the printer unit 111 to perform the printing processing. When receiving the instruction for performance from the job control module 307, the reading processing module 310 controls the scanner unit 112 to perform the scanning processing.

Figure 4:
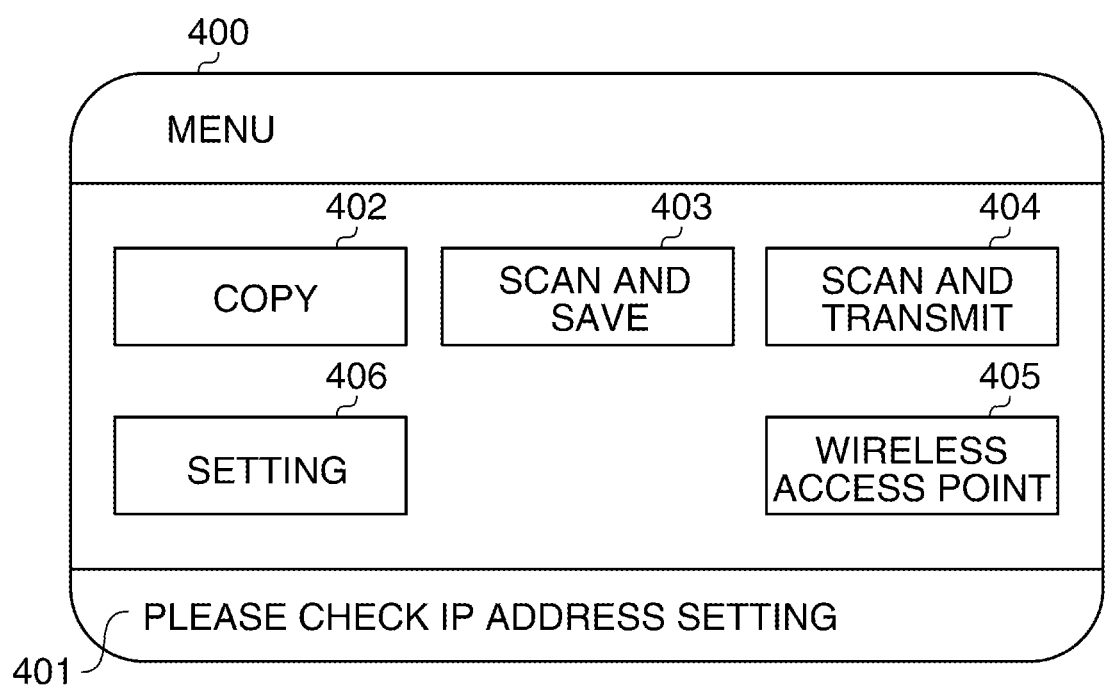
FIG. 4 is a diagram showing an exemplary menu screen to be displayed on an operation unit in FIG. 1.

Next, a menu screen 400 in FIG. 4 to be displayed on the operation unit 113, will be described. The menu screen 400 is an operation screen on which the user selects each function of the MFP 101. The menu screen 400 includes an information notifying region 401, a copy button 402, a scan and save button 403, a scan and transmission button 404, a wireless access-point button 405, and a setting button 406. The information notifying region 401 displays each notification to the user. The copy button 402 is selected when the user uses a copy function. The scan and save button 403 is selected when the user uses a function of saving image data acquired by a scan of the MFP 101 into the HDD 205. The scan and transmission button 404 is selected when the user uses a function of transmitting the image data acquired by the scan of the MFP 101 to a communication apparatus. The wireless access-point button 405 is selected when the MFP 101 transitions to the wireless access-point mode. The wireless access-point button 405 is displayed on the menu screen 400 in a case where an item for wireless access-point mode activation setting 1301 in FIG. 13 to be described later, has been set on. When the user selects the wireless access-point button 405, the operation unit 113 displays a start setting screen 500 in FIG. 5A to be described later. The setting button 406 is selected when the user changes each item of setting of the MFP 101. When the user selects the setting button 406 on the menu screen 400, the operation unit 113 displays a setting screen 600 in FIG. 6 to be described later.

Figure 5A:
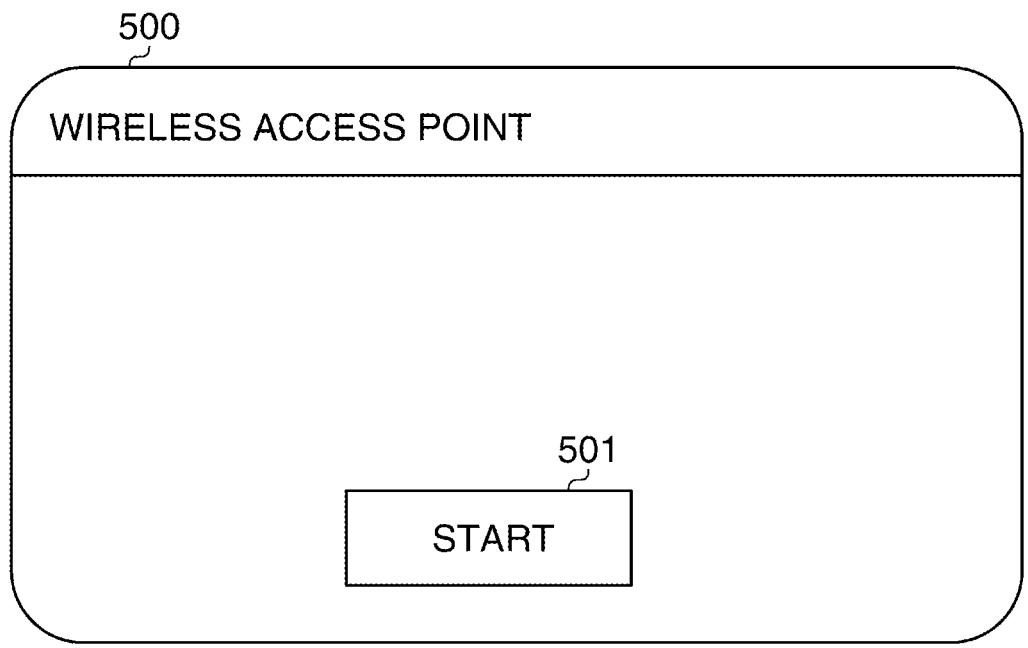
FIG. 5A is a diagram showing an exemplary screen for prompting start of a wireless access-point mode in the MFP in FIG. 1.

The start setting screen 500 in FIG. 5A is a setting screen for prompting start of the wireless direct. When the user selects a start button 501 on the start setting screen 500, the network setting module 303 is instructed to start transition to the wireless access-point mode. This arrangement allows the MFP 101 to operate as an access point, so that the wireless direct with the client PC 109 can start. That is, in the present embodiment, a simple operation including the selection of the wireless access-point button 405 on the menu screen 400 and the selection of the start button 501 on the start setting screen 500, enables the user to issue the instruction for transition to the wireless access-point mode.

Figure 5B:
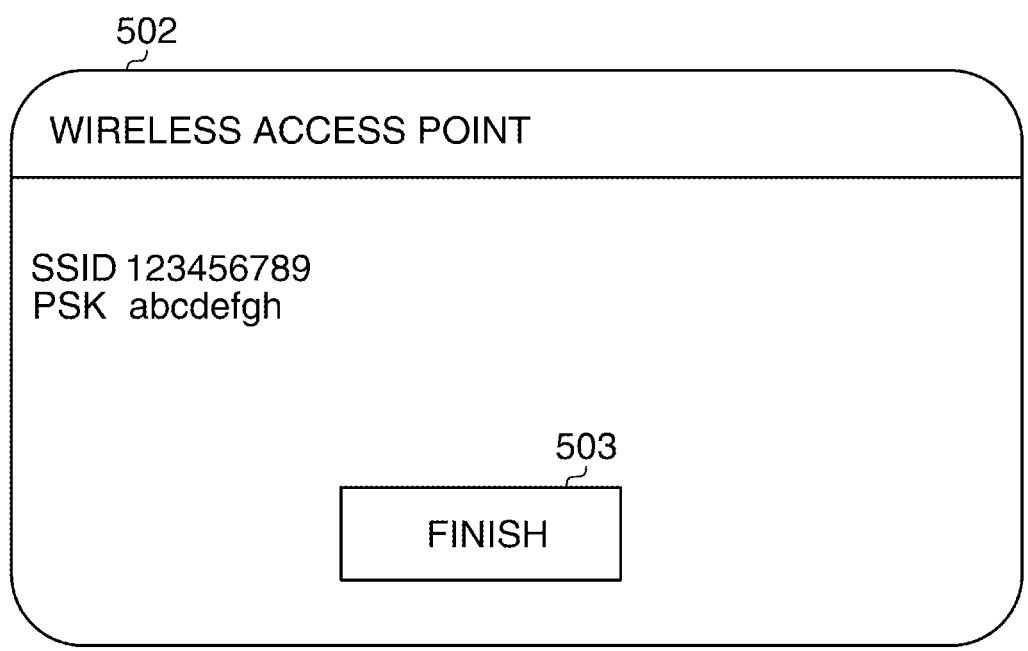
FIG. 5B is a diagram showing an exemplary screen for prompting finish of the wireless access-point mode in the MFP in FIG. 1.

When the user selects the start button 501, the operation unit 113 displays a setting information screen 502 in FIG. 5B. The setting information screen 502 displays setting information, such as SSID and PSK, that the client PC 109 needs in order to communication-connect with the MFP 101 being the access point. When the user selects a finish button 503 on the setting information screen 502, the network setting module 303 is instructed to finish the wireless access-point mode. This arrangement allows the MFP 101 to finish the wireless direct with the client PC 109.

Figure 6:
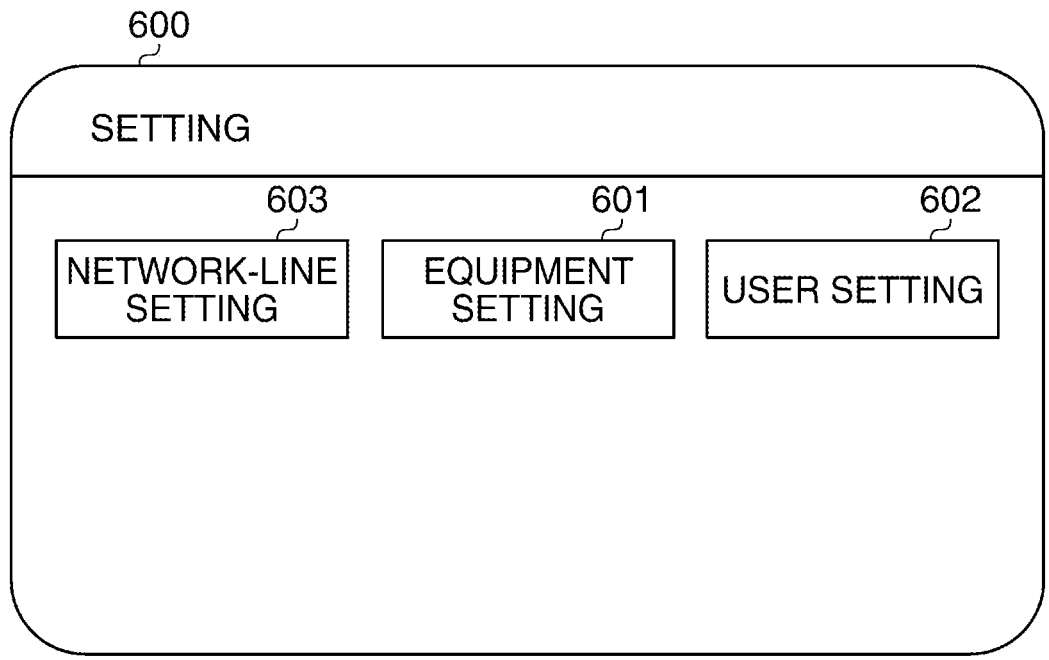
FIG. 6 is a diagram showing an exemplary setting screen to be displayed on the operation unit in FIG. 1.

The setting screen 600 in FIG. 6 is an operation screen for guiding the user to a setting screen on which detailed information on each item of setting is to be set. The setting screen 600 includes an equipment setting button 601, a user setting button 602, and a network-line setting button 603. The equipment setting button 601 is an operation button for displaying an equipment setting screen, not shown, on which equipment setting of the MFP 101 is to be performed. The user setting button 602 is an operation button for displaying a user setting screen, not shown, on which setting regarding the user of the MFP 101 is to be performed. The network-line setting button 603 is an operation button for displaying a network setting screen 700 in FIG. 7 on which communication setting of the MFP 101 is to be performed.

Figure 7:
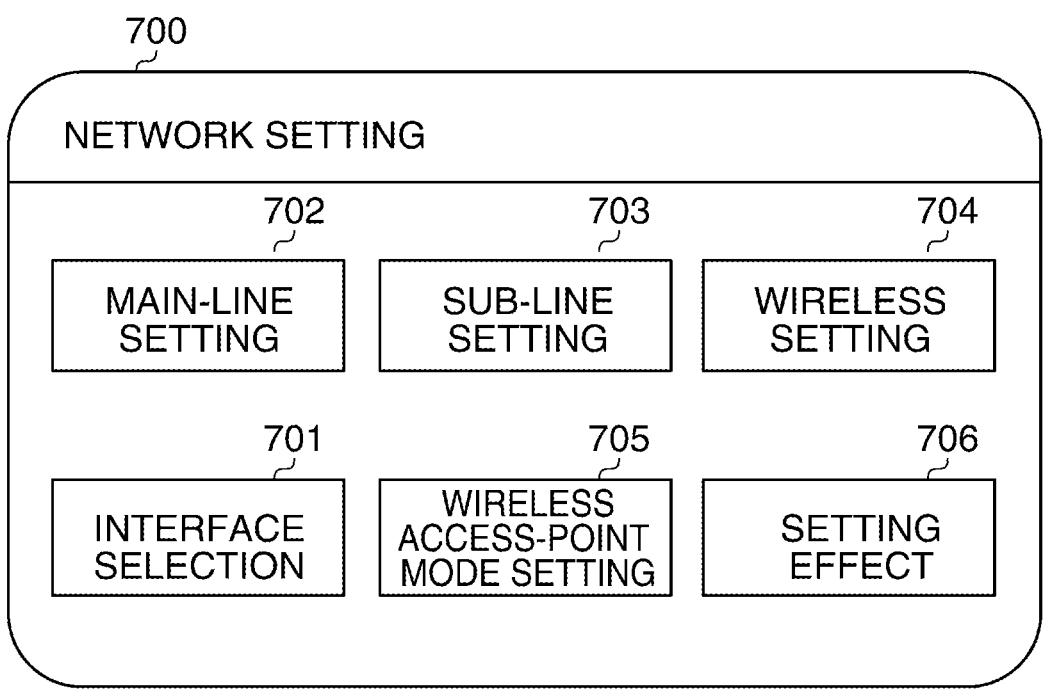
FIG. 7 is a diagram showing an exemplary network setting screen to be displayed on the operation unit in FIG. 1.

The network setting screen 700 in FIG. 7 is an operation screen for guiding the user to a setting screen on which detailed information regarding the communication setting is to be set. The network setting screen 700 includes an interface selecting button 701, a main-line setting button 702, a sub-line setting button 703, a wireless setting button 704, a wireless access-point mode setting button 705, and a setting-effect button 706. The interface selecting button 701 is an operation button for displaying an interface selecting screen 800 in FIG. 8 to be described later. The main-line setting button 702 is an operation button for displaying a main-line setting screen 900 in FIG. 9 to be described later. The sub-line setting button 703 is an operation button for displaying a sub-line setting screen 1000 in FIG. 10 to be described later. The wireless setting button 704 is an operation button for displaying a wireless setting screen 1100 in FIG. 11 to be described later. The wireless access-point mode setting button 705 is an operation button for displaying a wireless access-point setting screen 1300 in FIG. 13 to be described later. The setting-effect button 706 is an operation button for storing a set value set by the user into the HDD 205 and for instructing the network setting module 303 to make the setting effective.

Figure 8:
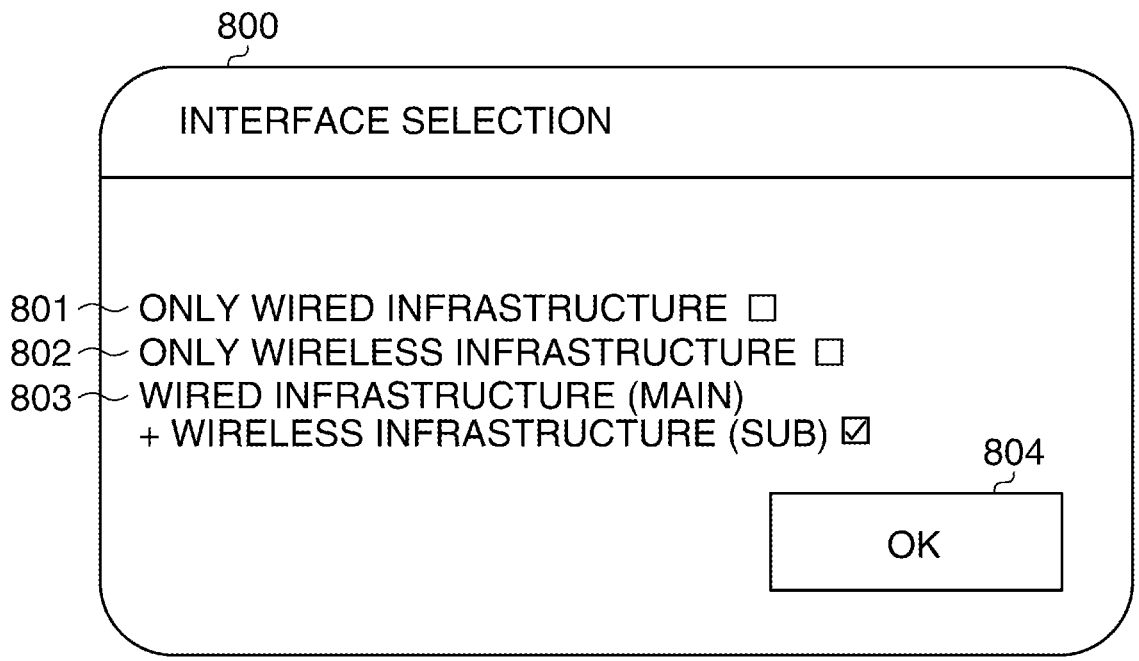
FIG. 8 is a diagram showing an exemplary interface selecting screen to be displayed on the operation unit in FIG. 1.

The interface selecting screen 800 in FIG. 8 is a setting screen for setting regarding the wired infrastructure and the wireless infrastructure in the MFP 101. An administrator of the MFP 101 performs each item of setting on the interface selecting screen 800, and does not change each item of setting frequently. The operation unit 113 displays the interface selecting screen 800 when the user performs a plurality of operations in which the setting button 406, the network-line setting button 603, and the interface selecting button 701 are selected in this order. When an item for only wired infrastructure 801 is set on, the MFP 101 uses only the wired infrastructure. When an item for only wireless infrastructure 802 is set on, the MFP 101 uses only the wireless infrastructure. When an item for wired infrastructure (main)+ wireless infrastructure (sub) 803 is set on, the MFP 101 uses both of the wired infrastructure and the wireless infrastructure. Specifically, the MFP 101 uses the wired infrastructure as the main line and uses the wireless infrastructure as the sub-line. On the interface selecting screen 800, only any one of the three items for only wired infrastructure 801, for only wireless infrastructure 802, and for wired infrastructure (main)+wireless infrastructure (sub) 803 can be set on. When an OK button 804 is selected, the set value on the interface selecting screen 800 is stored into the HDD 205. It should be noted that, in the present embodiment, the setting regarding the wireless infrastructure is not associated with the setting regarding the wireless direct and thus the set value on the interface selecting screen 800 has no influence on the setting regarding the wireless direct.

Figure 9:
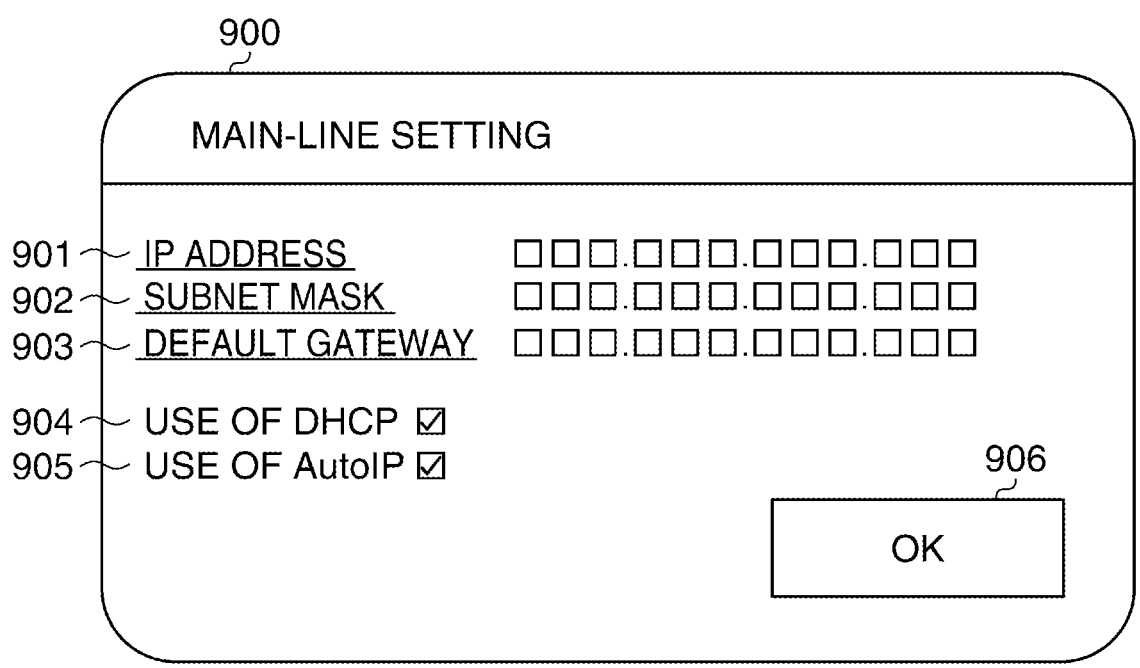
FIG. 9 is a diagram showing an exemplary main-line setting screen to be displayed on the operation unit in FIG. 1.

The main-line setting screen 900 in FIG. 9 is an operation screen for setting of address information on the main line of the MFP 101. The user can input an arbitrary IP address, subnet mask, and default gateway into an IP-address input part 901, a subnet-mask input part 902, and a default-gateway input part 903, respectively. When a DHCP selecting part 904 is set on, the effect is set that an IP address for the main line is to be acquired from a DHCP server on the network of the main line. When an automatic private IP addressing (AutoIP) selecting part 905 is set on, the effect is set that an IP address for the main line is to be determined on the basis of an AutoIP protocol. When an OK button 906 is selected, each set value on the main-line setting screen 900 is stored into the HDD 205.

Figure 10:
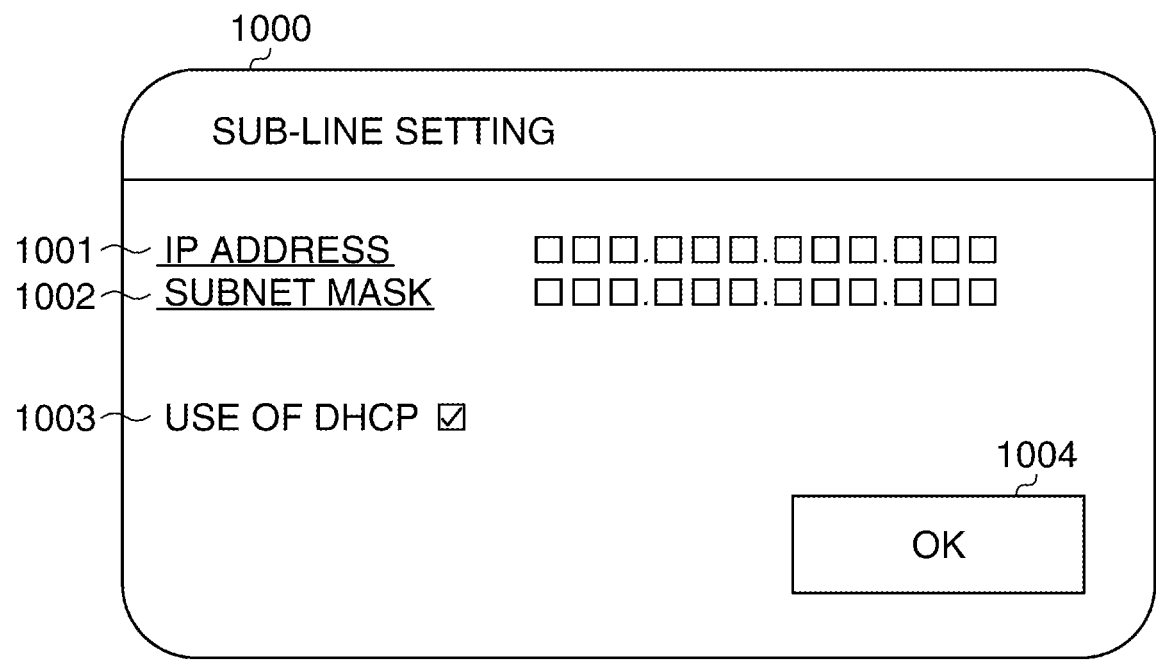
FIG. 10 is a diagram showing an exemplary sub-line setting screen to be displayed on the operation unit in FIG. 1.

The sub-line setting screen 1000 in FIG. 10 is an operation screen for setting of address information on the sub-line of the MFP 101. The user can input an arbitrary IP address and subnet mask into an IP-address input part 1001 and a subnet-mask input part 1002, respectively. When a DHCP selecting part 1003 is set on, the effect is set that an IP address for the sub-line is to be acquired from a DHCP server on the network of the sub-line. When an OK button 1004 is selected, each set value on the sub-line setting screen 1000 is stored into the HDD 205. It should be noted that, in the present embodiment, because a plurality of lines is used simultaneously, the function on the sub-line side is partially limited, for example, no default gateway and no AutoIP are available in the sub-line. Thus, in the present embodiment, for example, the sub-line is used as a line for communication in a particular network. Meanwhile, the main line is used as a line for communication in a large-scale network including an external network with the default gateway, in addition to a particular network. Setting items for use of a default gateway and AutoIP are not provided on the sub-line setting screen 1000. In addition, for example, a function, such as DNS, 802.1x, IPsec, IP filtering, port filtering, MAC address filtering, SMB, HTTP, WebDAV, or FTP, is not available on the sub-line side.

Figure 11:
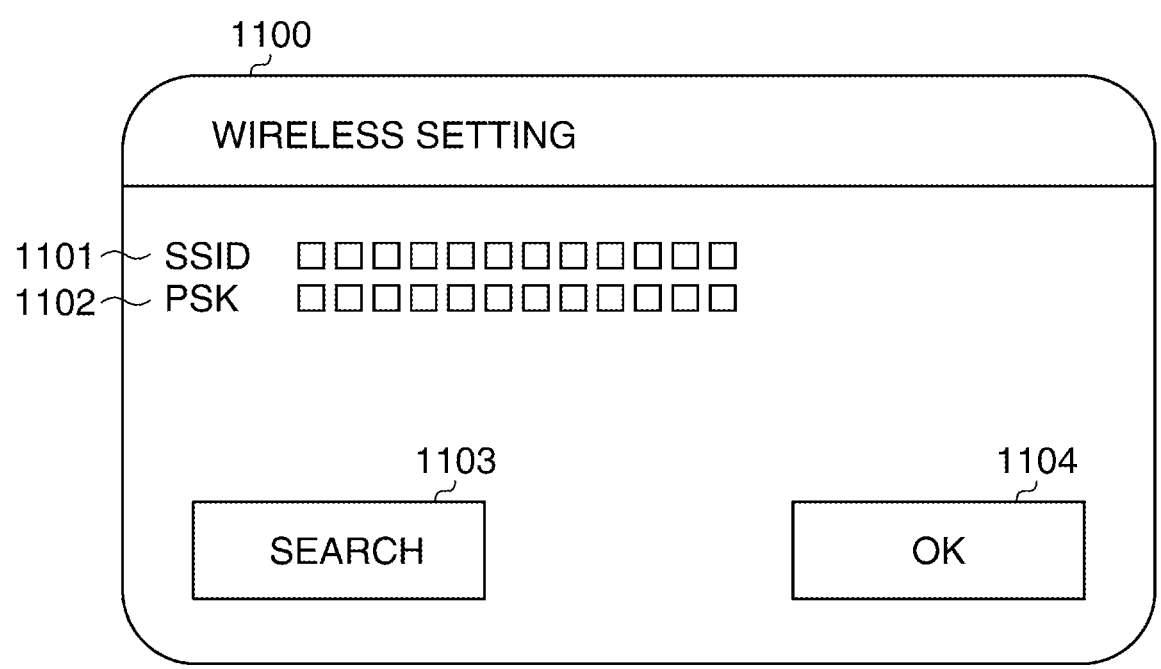
FIG. 11 is a diagram showing an exemplary wireless setting screen to be displayed on the operation unit in FIG. 1.

The wireless setting screen 1100 in FIG. 11 is an operation screen for authentication setting in the wireless infrastructure mode. The SSID of an access point that the MFP 101 uses and a key corresponding to the SSID are input into an SSID input part 1101 and a PSK input part 1102, respectively. When a search button 1103 is selected, the operation unit 113 displays an access-point selecting screen 1200 in FIG. 12 for selection of an access point. When an OK button 1104 is selected, each set value on the wireless setting screen 1100 is stored into the HDD 205.

Figure 12:
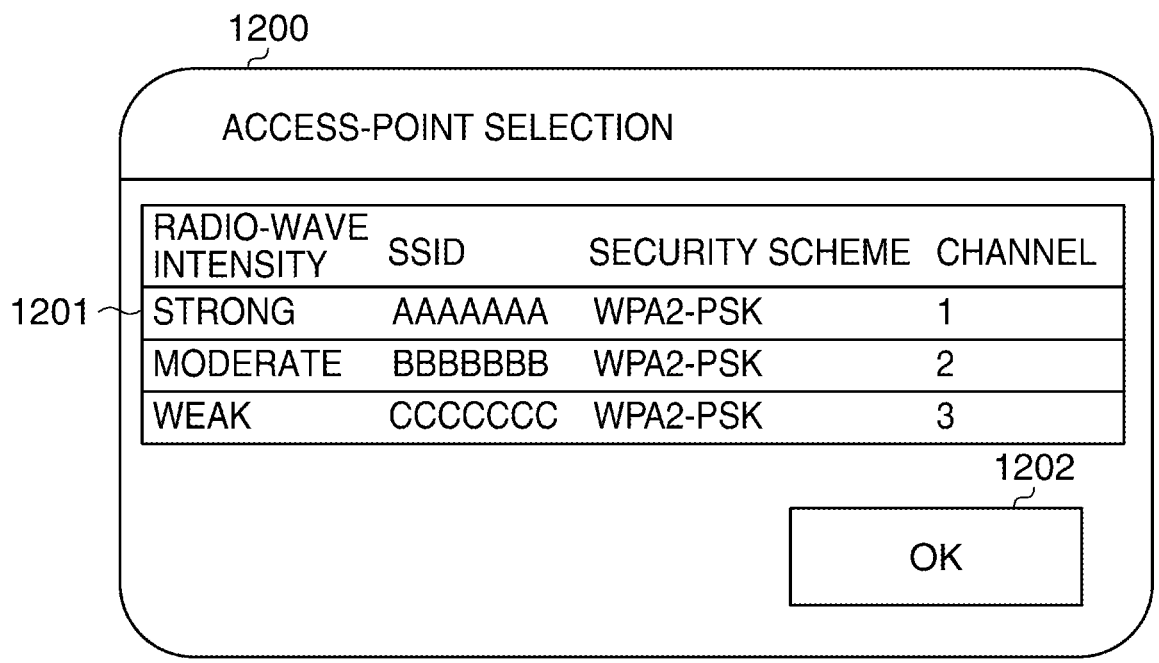
FIG. 12 is a diagram showing an exemplary access-point selecting screen to be displayed on the operation unit in FIG. 1.

The access-point selecting screen 1200 in FIG. 12 is an operation screen for setting of an access point that the MFP 101 uses. A list of access points available to the MFP 101 is displayed on a search-result display part 1201. When the user selects, for example, the access point 105 from the list of access points displayed on the search-result display part 1201 and selects an OK button 1202, information indicating the access point 105 is stored into the HDD 205. After that, the operation unit 113 displays the wireless setting screen 1100 having the SSID of the access point 105 set in the SSID input part 1101.

Figure 13:
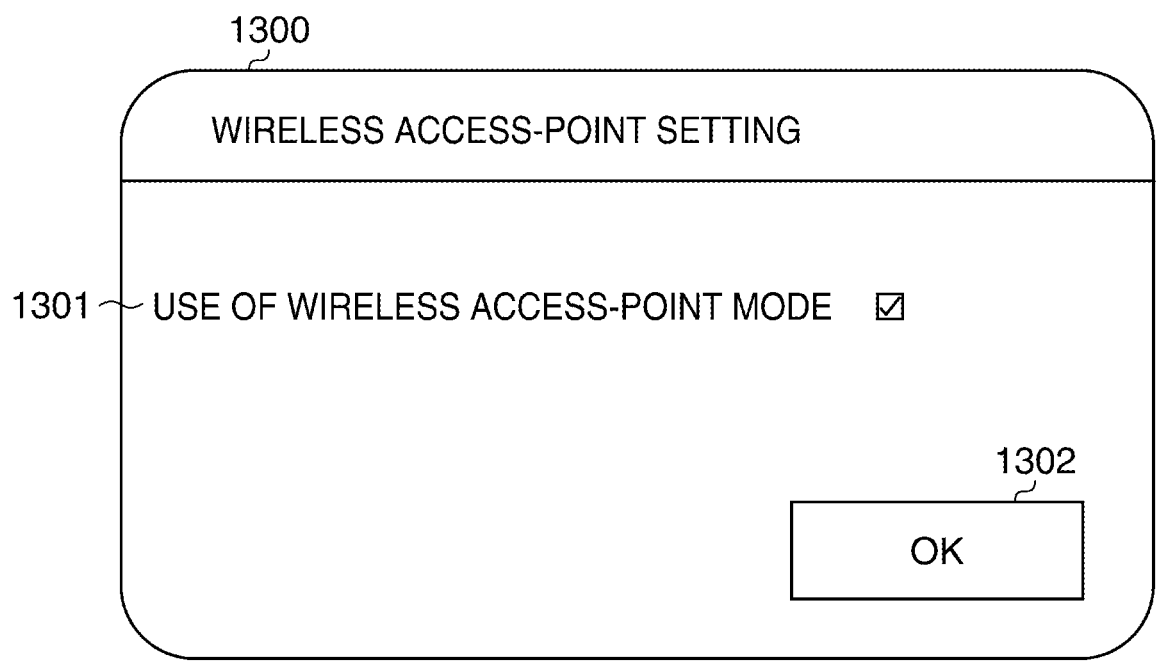
FIG. 13 is a diagram showing an exemplary wireless-access-point setting screen to be displayed on the operation unit in FIG. 1.

The wireless access-point setting screen 1300 in FIG. 13 is a setting screen for setting regarding the wireless access-point mode. The administrator of the MFP 101 performs setting on the wireless access-point setting screen 1300, and does not change the setting frequently. When the item for wireless access-point mode activation setting 1301 is set on, the wireless access-point mode of the MFP 101 is activated. The menu screen 400 displayed on the operation unit 113 with the wireless access-point mode active, includes the wireless access-point button 405 for displaying the start setting screen 500 prompting transition to the wireless access-point mode. Meanwhile, when the item for wireless access-point mode activation setting 1301 is set off, the wireless access-point mode of the MFP 101 is inactivated. The menu screen 400 displayed on the operation unit 113 with the wireless access-point mode inactive, includes no wireless access-point button 405. When an OK button 1302 is selected, the set value on the wireless access-point setting screen 1300 is stored into the HDD 205 and the display of the operation unit 113 switches to the network setting screen 700.

Next, processing regarding the setting of the address information on the MFP 101, will be described.

Figure 14:
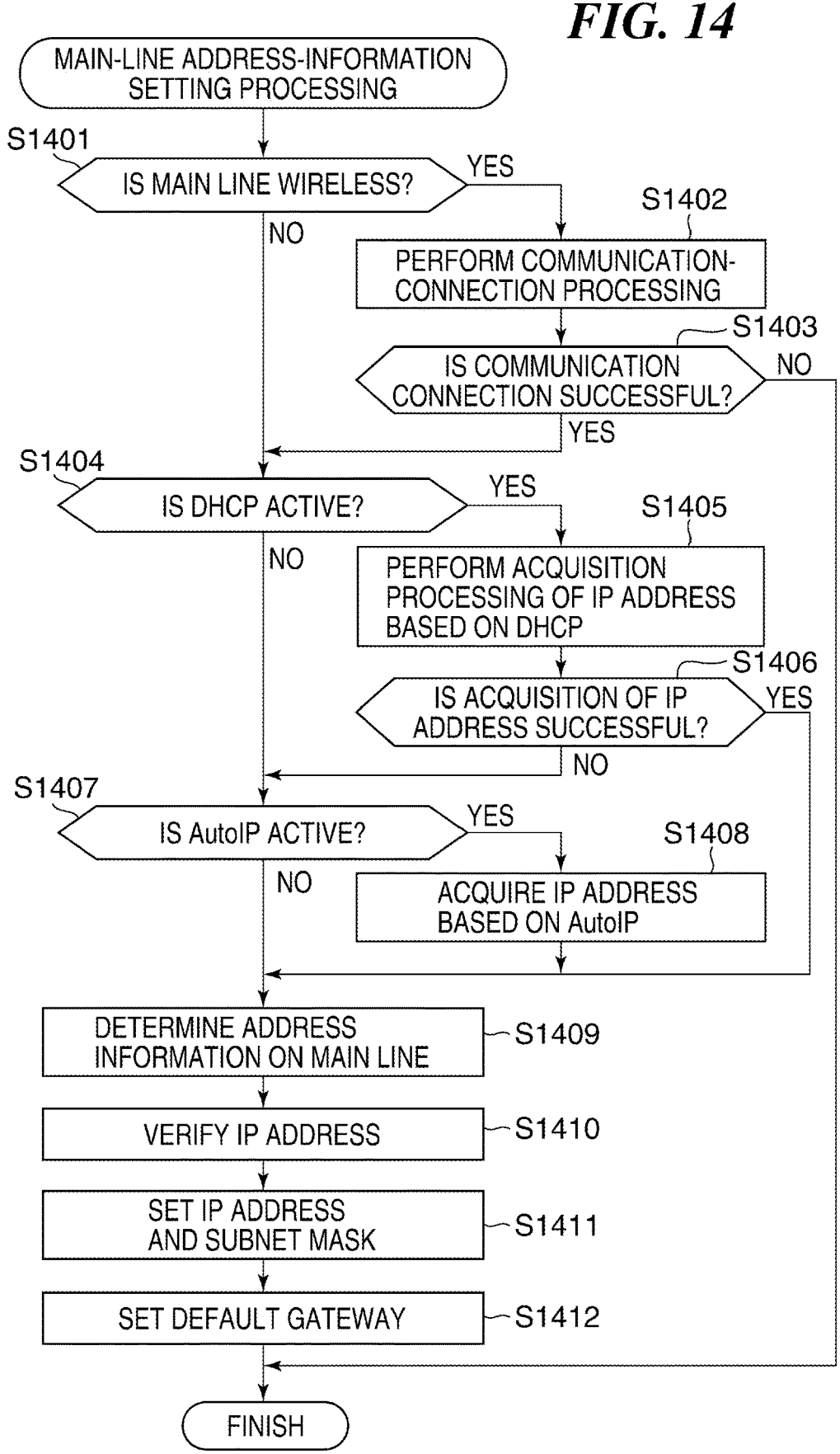
FIG. 14 is a flowchart showing the procedure of main-line address-information setting processing to be performed by a network setting module in FIG. 3.

FIG. 14 is a flowchart showing the procedure of main-line address information setting processing to be performed by the network setting module 303 in FIG. 3.

The CPU 201 executes a program stored in the HDD 205, to perform the processing in FIG. 14. In a case where the system of the MFP 101 starts up or in a case where the setting-effect button 706 on the network setting screen 700 is selected, the processing in FIG. 14 is performed. The processing in FIG. 14 is at least based on the premise that the setting has already been performed on the respective screens in FIGS. 8, 9, and 11.

Here, for example, in a case where the DHCP server 104 is connected to the main line and the DHCP server 114 is connected to the sub-line, trouble may occur in the MFP 101 when the communication setting of the MFP 101 is performed. An exemplary case will be described where option data, such as address information on an SMTP server, that is not required to have a unique value set for each line, is provided together with a different value from each of the DHCP servers 104 and 114. In this case, the MFP 101 cannot determine which one of a plurality of pieces of acquired address information on the different SMTP servers that is acquired, is to be set. As a result, trouble in which the address information on an appropriate SMTP server cannot be set in the communication setting, occurs in the MFP 101.

In order to solve the trouble in the present embodiment, from a plurality of types of option data, a type of option data not required to have a unique value set for each of the main line and the sub-line, is not requested to the DHCP server connected to either the main line or the sub-line. An exemplary case will be described below where, from the types of option data, a type of option data not required to have a unique value set for each of the main line and the sub-line, is not requested to the DHCP server connected to the sub-line.

In FIG. 14, the network setting module 303 first determines whether the main line is wireless (step S1401). At step S1401, in a case where the HDD 205 stores the set value indicating the "item for only wireless infrastructure 802", the network setting module 303 determines that the main line is wireless. Meanwhile, in a case where the HDD 205 stores the set value indicating either the "item for only wired infrastructure 801" or the "item for wired infrastructure (main)+wireless infrastructure (sub) 803", the network setting module 303 determines that the main line is not wireless.

When the main line is wireless as a result of the determination at step S1401, the network setting module 303 performs communication-connection processing with the access point set on the wireless setting screen 1100, for example, the access point 105 (step S1402). The network setting module 303 makes a request to the WPA control module 306 for processing, in the communication-connection processing. This arrangement allows the WPA control module 306 to acquire the SSID and the PSK of the access point 105 from the data storage module 302, to transmit an authentication request generated with the acquired PSK, to the access point 105. The WPA control module 306 receives a determined result of whether connection is permitted, from the access point 105. Next, the network setting module 303 determines whether communication connection with the access point 105 has succeeded (step S1403). At step S1403, in a case where the received determined result indicates that the connection is permitted, the network setting module 303 determines that the communication connection with the access point 105 has succeeded. Meanwhile, in a case where the received determined result indicates that the connection is not permitted, the network setting module 303 determines that the communication connection with the access point 105 has failed.

When the communication connection with the access point 105 has failed as a result of the determination at step S1403, the network setting module 303 finishes the present processing.

When the main line is not wireless as a result of the determination at step S1401 or when the communication connection with the access point 105 has succeeded as a result of the determination at step S1403, the network setting module 303 determines whether DHCP is active (step S1404). At step S1404, in a case where the HDD 205 stores the set value indicating that the DHCP selecting part 904 is on, the network setting module 303 determines that the DHCP is active. Meanwhile, in a case where the HDD 205 stores the set value indicating that the DHCP selecting part 904 is off, the network setting module 303 determines that the DHCP is inactive.

When the DHCP is active as a result of the determination at step S1404, the network setting module 303 performs acquisition processing of the IP address on the basis of on the DHCP (step S1405). At step S1405, the network setting module 303 requests the DHCP control module 304 to acquire the IP address based on the DHCP. In accordance with a DHCP protocol, the DHCP control module 304 that has received the request transmits DHCPDISCOVER for searching a DHCP server, to the DHCP server on the network of the main line of the MFP 101. The DHCP server that has received the DHCPDISCOVER, for example, the DHCP server 104 returns DHCPOFFER including an IP address being an assignment candidate, to the DHCP control module 304. The DHCP control module 304 transmits DHCPREQUEST for registering use of the IP address included in the DHCPOFFER, to the DHCP server 104. A DHCPREQUEST message includes an acquisition request for the types of option data provided by the DHCP server 104, in addition to the request for registering use of the IP address. The option data includes a subnet mask and address information on an SMTP server. In the present embodiment, an acquisition request for a different type of option data is made for each line.

In the MFP 101, the HDD 205 stores, in advance, an option table (management table) 1501 of FIG. 15 managing the option data to be requested to the respective DHCP servers connected to the main line and the sub-line. The option table 1501 has "each line" set, in an item for classification 1502, for the subnet mask being option data required to have a unique value set for each of the main line and the sub-line of the MFP 101. The "each line" in the item for classification 1502 indicates the effect that an acquisition request for the option data is to be made to the respective DHCP servers connected to the main line and the sub-line. The item for classification 1502 has "only main line" set for option data, such as address information on the SMTP server, that is not required to have a unique value set for each of the main line and the sub-line of the MFP 101, the option data corresponding to the function not used in the sub-line.

The "only main line" in the item for classification 1502 indicates the effect that an acquisition request for the option data is to be made to only the DHCP server connected to the main line. It should be noted that, in the present embodiment, the option table 1501 may have "only sub-line" set, in the item for classification 1502, for option data corresponding to the function used in only the sub-line from the main line and the sub-line. This arrangement can control an acquisition request for the option data to be made to only the DHCP server connected to the sub-line. The DHCP control module 304 determines the option data to which an acquisition request is to be made, on the basis of the item for classification 1502 in the option table 1501. At step S1405, the DHCP control module 304 makes an acquisition request for the option data having the "each line" or the "only main line" in the item for classification 1502.

Next, the network setting module 303 determines whether the IP address has been successfully acquired on the basis of the DHCP (step S1406).

When the IP address has been successfully acquired on the basis of the DHCP as a result of the determination at step S1406, the network setting module 303 performs the processing at step S1409 to be described later.

When the DHCP is inactive as a result of the determination at step S1404 or when the acquisition of the IP address based on the DHCP has failed as a result of the determination at step S1406, the network setting module 303 determines whether AutoIP is active (step S1407). At step S1407, in a case where the HDD 205 stores the set value indicating that the AutoIP selecting part 905 is on, the network setting module 303 determines that the AutoIP is active. Meanwhile, in a case where the HDD 205 stores the set value indicating that the AutoIP selecting part 905 is off, the network setting module 303 determines that the AutoIP is inactive.

When the AutoIP is active as a result of the determination at step S1407, the network setting module 303 acquires the IP address on the basis of the AutoIP (step S1408). At step S1408, the network setting module 303 performs selection processing of selecting one IP address, at random, from an IP address range previously prescribed for AutoIP. The network setting module 303 performs check processing of checking, on the basis of an ARP protocol, whether no communication apparatus having the IP address set is present on the network of the main line. In a case where a communication apparatus having the IP address set is present on the network of the main line, the network setting module 303 repeatedly performs the selection processing and the check processing until finding the IP address that is not used by any communication apparatuses on the network of the main line. Next, the network setting module 303 determines the address information on the main line of the MFP 101 (step S1409).

For example, when the DHCP is active, the network setting module 303 determines the IP address acquired from the searched DHCP server 104, the subnet mask corresponding to the IP address, and the default gateway, for the address information on the main line. In a case where the acquisition of the IP address has failed from the DHCP server 104 and the AutoIP is active or in a case where the DHCP is inactive and the AutoIP is active, the network setting module 303 determines the IP address acquired on the basis of the AutoIP, the subnet mask corresponding to the IP address, and the default gateway, for the address information on the main line. In a case where the acquisition of the IP address has failed from the DHCP server 104 and the AutoIP is inactive, the network setting module 303 determines an invalid address (0.0.0.0), the subnet mask corresponding to the invalid address, and the default gateway, for the address information on the main line. In a case where the DHCP and the AutoIP both are inactive, the network setting module 303 determines the set values input in the IP-address input part 901, the subnet-mask input part 902, and the default-gateway input part 903, for the address information on the main line.

Next, the network setting module 303 verifies the IP address in the determined address information (step S1410). In a case where the IP address is the invalid address as a result of the verification, the operation unit 113 displays a message prompting a check for the IP address. Next, the network setting module 303 sets the IP address and the subnet mask in the determined address information, into the TCP/IP control module 305 (step S1411). Next, the network setting module 303 sets the default gateway in the determined address information, into the TCP/IP control module 305 (step S1412) and then finishes the present processing.

Figure 16:
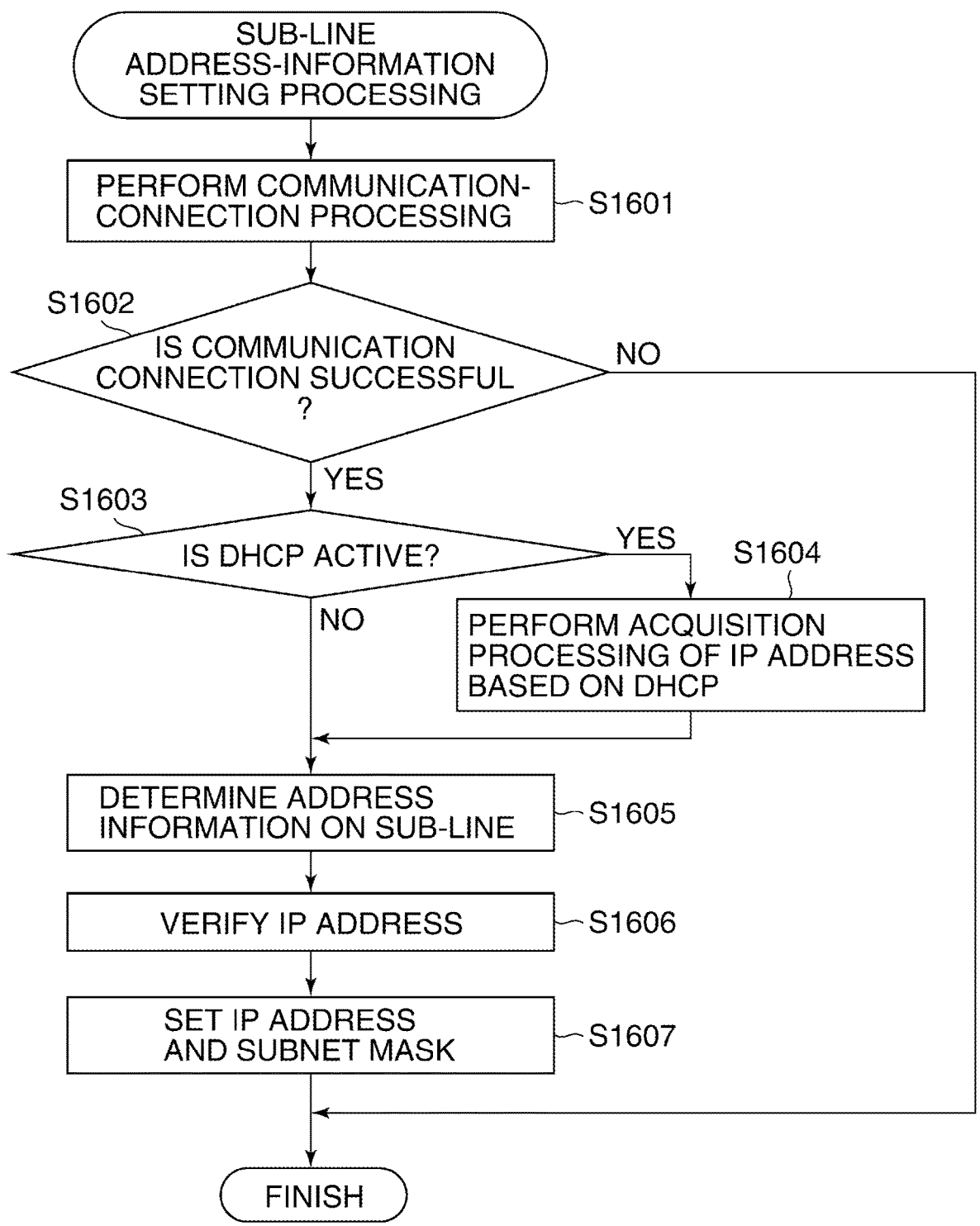
FIG. 16 is a flowchart showing the procedure of sub-line address-information setting processing to be performed by the network setting module in FIG. 3.

FIG. 16 is a flowchart showing the procedure of sub-line address-information setting processing to be performed by the network setting module 303 in FIG. 3.

The CPU 201 executes a program stored in the HDD 205, to perform the processing in FIG. 16. When the HDD 205 stores the set value indicating selection of the "item for wired infrastructure (main)+wireless infrastructure (sub) 803" and the processing in FIG. 14 described above finishes, the processing in FIG. 16 is performed.

In FIG. 16, the network setting module 303 performs the above communication-connection processing with the access point set on the wireless setting screen 1100, for example, the access point 105 (step S1601). Next, the network setting module 303 determines whether communication connection with the access point 105 has succeeded (step S1602).

When the communication connection with the access point 105 has failed as a result of the determination at step S1602, the network setting module 303 finishes the present processing. When the communication connection with the access point 105 has succeeded as a result of the determination at step S1602, the network setting module 303 determines whether DHCP is active, on the basis of the set value of the DHCP selecting part 1003 stored in the HDD 205 (step S1603).

When the DHCP is inactive as a result of the determination at step S1603, the network setting module 303 performs the processing at step S1605 to be described later. When the DHCP is active as a result of the determination at step S1603, the network setting module 303 performs acquisition processing of an IP address on the basis of the DHCP (step S1604) (option-data requesting unit). At step S1604, an acquisition request for the option data having the "each line" in the item for classification 1502, is made in addition to a request for registering use of the IP address. That is, in the present embodiment, a type of option data corresponding to the function not used in the sub-line, from the types of option data, is not requested to the DHCP server connected to the sub-line having a more limited function than the main line, specifically, the DHCP server 114. It should be noted that, due to the specifications of the DHCP server 114, at step S1604, the DHCP server 114 may transmit a type of option parameter corresponding to the "only main line" although no request is made. In this case, the MFP 101 does not set but destroy the received type of option parameter corresponding to the "only main line". Next, the network setting module 303 determines the address information on the sub-line of the MFP 101 (step S1605).

Next, the network setting module 303 verifies the IP address in the determined address information (step S1606). Next, the network setting module 303 sets the IP address and the subnet mask in the determined address information, into the TCP/IP control module 305 (step S1607) and finishes the present processing.

According to the embodiment described above, from the types of option data, a type of option data not required to have a unique value set for each of the main line and the sub-line, is not requested to the DHCP server connected to either the main line or the sub-line. That is, the type of option data not required to have a unique value set for each line, is not provided together with a different value from each of the DHCP servers 104 and 114 in the lines. Thus, there is no need to determine which one of the pieces of address information on the different SMTP servers that are acquired, is to be set. This arrangement can prevent trouble from occurring in the communication setting due to the different DHCP servers 104 and 114 connected to the main line and the sub-line, respectively.

In the embodiment described above, the option data to be requested to the DHCP servers 104 and 114 connected to the main line and the sub-line, respectively, is determined on the basis of the option table 1501. This arrangement enables an acquisition request for a type of option data appropriate to each of the main line and the sub-line, to be made.

Furthermore, in the embodiment described above, because the sub-line has a more limited function than the main line, a type of option data corresponding to the function not used in the sub-line, from the types of option data, is not requested to the DHCP server 114 connected to the sub-line. This arrangement can prevent the type of option data corresponding to the function not used in the sub-line, from being transmitted from the DHCP server 114 connected to the sub-line. As a result, without loss of the usability of the sub-line, the same types of option data having different values can be inhibited from being transmitted from the DHCP servers 104 and 114.

In the embodiment described above, in a case where the type of option data corresponding to the function not used in the sub-line, is acquired from the DHCP server 114 connected to the sub-line, the MFP 101 does not set the acquired option data. This arrangement can prevent inappropriate communication setting from being performed even when the DHCP server 114 transmits the type of option data corresponding to the function not used in the sub-line, due to the specifications of the DHCP server 114, although not request is made.

Figure 17:
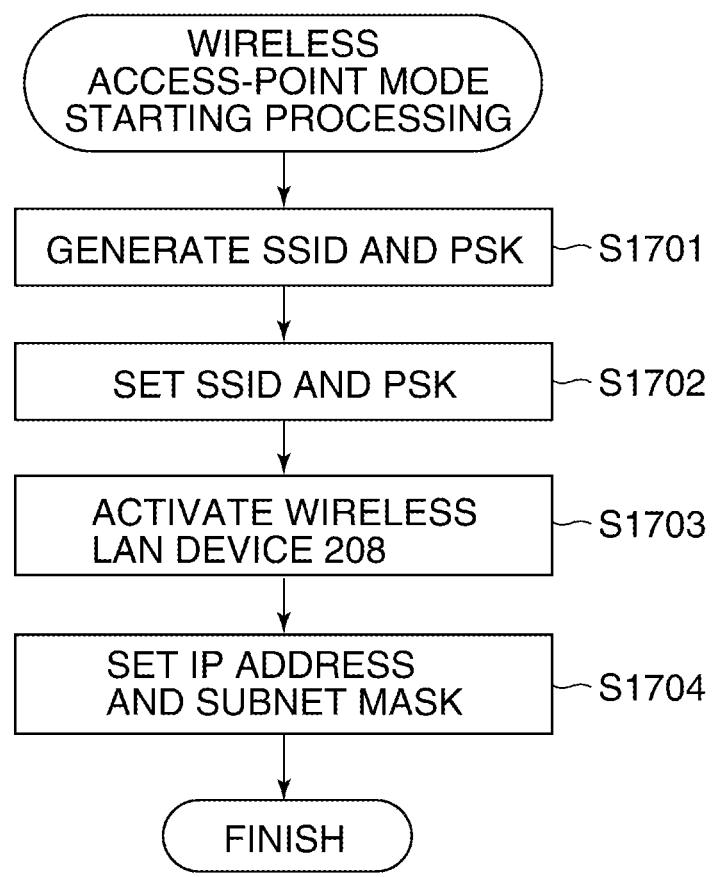
FIG. 17 is a flowchart showing the procedure of wireless access-point mode starting processing to be performed by the network setting module in FIG. 3.

FIG. 17 is a flowchart showing the procedure of wireless access-point mode starting processing to be performed by the network setting module 303 in FIG. 3.

The CPU 201 executes a program stored in the HDD 205, to perform the processing in FIG. 17. When the user selects the start button 501 on the start setting screen 500, the processing in FIG. 17 is performed. The processing in FIG. 17 is based on the premise that address information on the wireless access-point mode, specifically, an IP address and a subnet mask are assigned in advance.

In FIG. 17, the network setting module 303 requests the WPA control module 306 to generate SSID and PSK for the MFP 101 as an access point (step S11701). Next, the network setting module 303 requests the WPA control module 306 to set the SSID and the PSK (step S1702). Next, the network setting module 303 requests the WPA control module 306 to activate the wireless LAN device 208 set in the wireless access-point mode (step S1703). Next, the network setting module 303 sets the address information on the wireless access-point mode. Specifically, the network setting module 303 sets the IP address and the subnet mask in the address information on the wireless access-point mode, into the TCP/IP control module 305 (step S1704). This arrangement enables the MFP 101 to start the wireless direct. After that, the network setting module 303 finishes the present processing.

Figure 18:
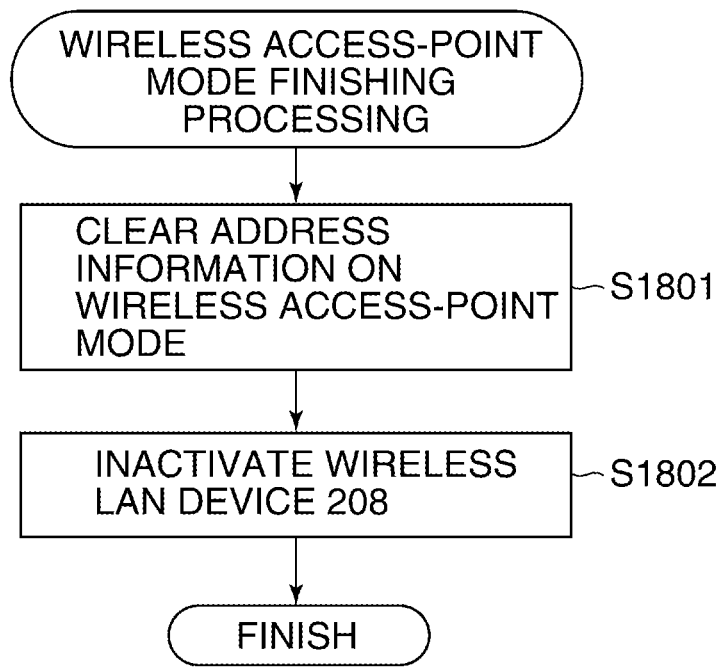
FIG. 18 is a flowchart showing the procedure of wireless access-point mode finishing processing to be performed by the network setting module in FIG. 3.

FIG. 18 is a flowchart showing the procedure of wireless access-point mode finishing processing to be performed by the network setting module 303 in FIG. 3.

The CPU 201 executes a program stored in the HDD 205, to perform the processing in FIG. 18. When the user selects the finish button 503 on the setting information screen 502 with the MFP 101 in the wireless access-point mode, the processing in FIG. 18 is performed.

In FIG. 18, the network setting module 303 clears the set address information on the wireless access-point mode, specifically, the IP address and the subnet mask of the wireless access-point mode (step S1801). Next, the network setting module 303 requests the WPA control module 306 to inactivate the wireless LAN device 208 set in the wireless access-point mode (step S1802). After that, the network setting module 303 finishes the present processing.

Next, a second embodiment of the present invention will be described.

The configuration and function of the second embodiment of the present invention are basically the same as those of the first embodiment described above. However, the second embodiment of the present invention is different from the first embodiment of the present invention in that an IP address in IPv6 is used. Thus, the descriptions of the duplicate configuration and function will be omitted and the descriptions of the different configuration and function will be given.

Figure 19:
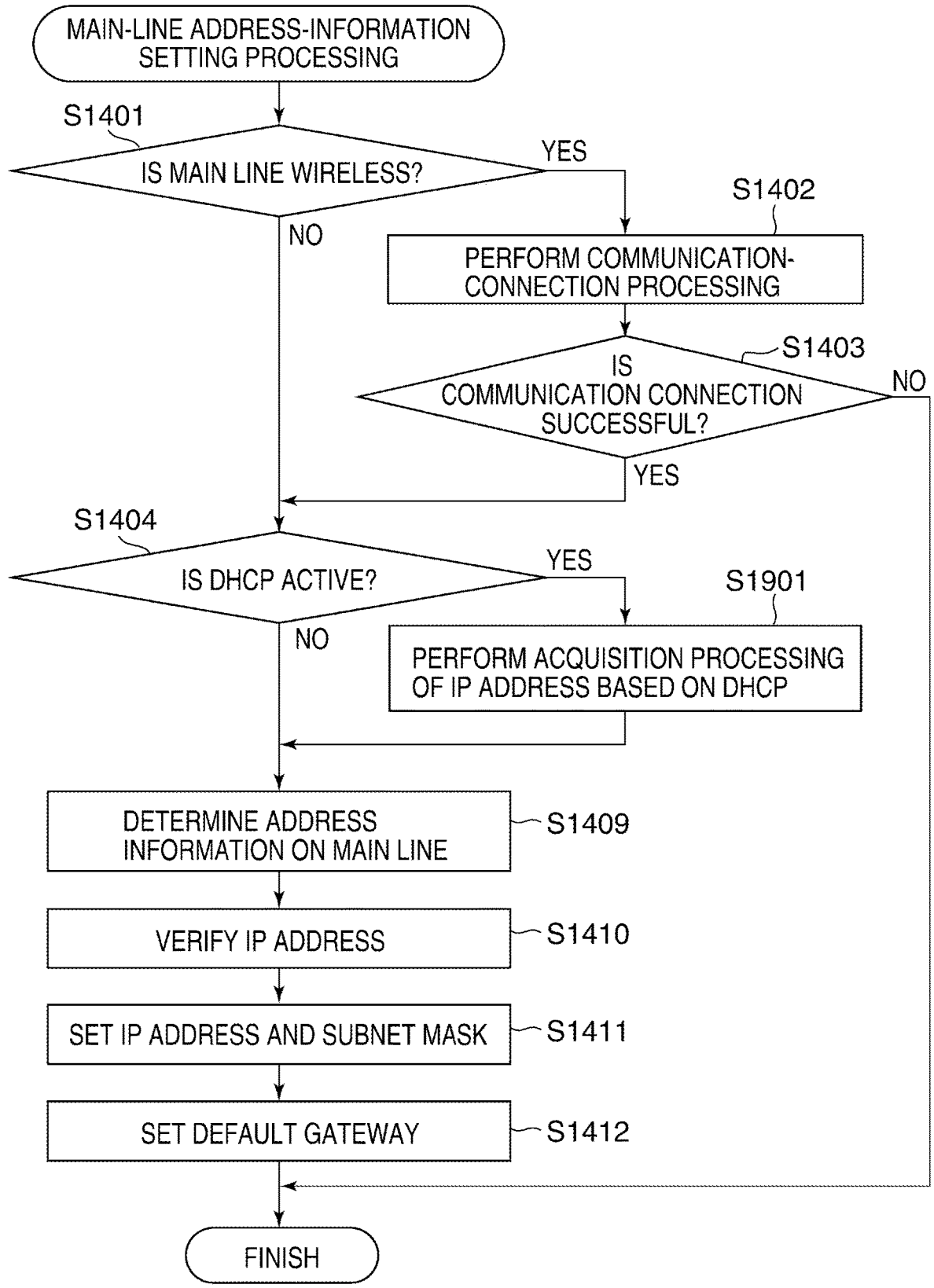
FIG. 19 is a flowchart showing the procedure of main-line address-information setting processing to be performed by a network setting module according to a second embodiment.

FIG. 19 is a flowchart showing the procedure of main-line address-information setting processing to be performed by a network setting module 303 in the second embodiment.

The CPU 201 executes a program stored in an HDD 205, to perform the processing in FIG. 19. In a case where the system of an MFP 101 starts up or in a case where a setting-effect button 706 on a network setting screen 700 is selected, the processing in FIG. 19 is performed. The processing in FIG. 19 is at least based on the premise that setting has already been performed on the respective screens in FIGS. 8, 9, and 11.

In FIG. 19, the network setting module 303 first performs the processing at steps S1401 to S1404.

When DHCP is inactive as a result of determination at step S1404, the network setting module 303 performs the processing at and after step S1409. When the DHCP is active as a result of the determination at step S1404, the network setting module 303 performs acquisition processing of an IP address on the basis of the DHCP (step S1901). At step S1901, the MFP 101 multicasts DHCPSOLICIT to search a DHCP server. The DHCP server that has received the DHCPSOLICIT, returns DHCPADVERTISE to notify the MFP 101 of the effect that a DHCP service can be provided. The MFP 101 transmits DHCPREQUEST to the DHCP server that has transmitted the DHCPADVERTISE, to make a request for assignment of the IP address. The DHCPREQUEST includes an acquisition request for option data determined on the basis of an option table 2001 in FIG. 20, in addition to the request for assignment of the IP address. At step S1901, an acquisition request is made for the option data having "only main line" in an item for classification 2002. The DHCP server that has acquired the DHCPREQUEST, returns DHCPREPLY including the assigned IP address and the option data corresponding to the DHCPREQUEST, to the MFP 101. Next, the network setting module 303 performs the processing at and after step S1409.

Figure 21:
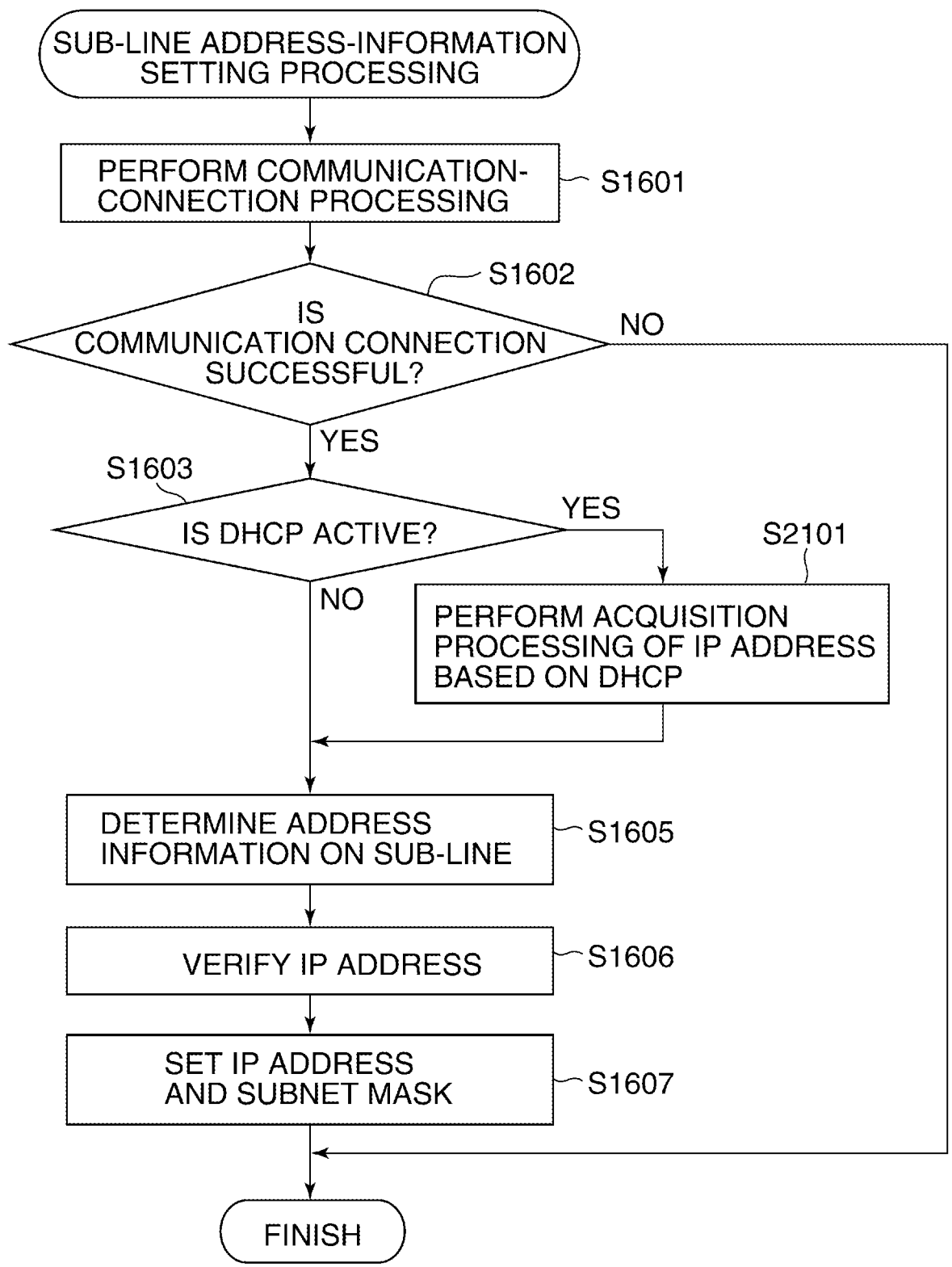
FIG. 21 is a flowchart showing the procedure of sub-line address-information setting processing to be performed by the network setting module according to the second embodiment.

FIG. 21 is a flowchart showing the procedure of sub-line address-information setting processing to be performed by the network setting module 303 in the second embodiment.

The CPU 201 executes a program stored in the HDD 205, to perform the processing in FIG. 21. When the HDD 205 stores a set value indicating selection of an "item for wired infrastructure (main)+wireless infrastructure (sub) 803" and the above processing in FIG. 19 finishes, the processing in FIG. 21 is performed.

In FIG. 21, the network setting module 303 performs the processing at steps S1601 to S1603.

When DHCP is inactive as a result of determination at step S1603, the network setting module 303 performs the processing at and after step S1605. When the DHCP is active as a result of the determination at step S1603, the network setting module 303 performs acquisition processing of an IP address on the basis of the DHCP (step S2101). At step S2101, a request for assignment of the IP address is made. It should be noted that IPv6 enables network information or apparatus information to be specified from the IP address even without a subnet mask. Thus, the MFP 101 does not make an acquisition request for the subnet mask in a sub-line in a case where the IP address in IPv6 is used. That is, in the present embodiment, in a case where the IP address in IPv6 is used, no acquisition request for option data in the sub-line is made as shown in the option table 2001. Next, the network setting module 303 performs the processing at and after step S1605.

It should be noted that the MFP 101 may have a plurality of lines each having a more limited function than the main line, in addition to the sub-line. This arrangement can prevent unnecessary option data from being transmitted from DHCP servers connected to the lines other than the main line, so that inappropriate communication setting can be prevented from being performed due to the respective different DHCP servers connected to the lines.

It should be noted that, in the embodiments described above, the main line may be replaced with a name such as a primary line or a prior line, and the sub-line may be replaced with a name such as a secondary line or an auxiliary line.

In the embodiments described above, the line may be replaced with a name such as an infrastructure.

Furthermore, although the configuration in which the lines are achieved with the physically different network interfaces, has been described in the embodiments described above, a configuration in which a plurality of logical lines is achieved with a single network interface, may be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-167362, filed Aug. 31, 2017, which is hereby incorporated by reference herein in its entirety.

What is claimed is:

1. An information processing apparatus having a first network interface and a second network interface connected to a network different from the first network interface, wherein function of a communication performed via the second network interface is more limited than that of a communication performed via the first network interface, the information processing apparatus comprising:
   at least one memory that stores a set of instructions; and
   at least one processor that executes the instructions, the instructions, when executed, causing the information processing apparatus to perform operations comprising:
   send a first DHCP request including at least a first type of optional parameters to a first DHCP server on a first network connected to the information processing apparatus via the first network interface; and
   send a second DHCP request not including the first type of optional parameters to a second DHCP server on a second network connected to the information processing apparatus via the second network interface.

2. The information processing apparatus according to claim 1, wherein the at least one memory stores information indicating types of option parameter to be requested to the first DHCP server connected to the first network interface and the second DHCP server connected to the second network interface, and
   the instructions further including an instruction for deciding, based on the stored information, the types of option parameter to be requested to the first DHCP server connected to the first network interface and the second DHCP server connected to the second network interface.

3. The information processing apparatus according to claim 1, wherein the number of types of optional parameters included in the second DHCP request is less than the number of types of optional parameters included in the first DHCP request.

4. The information processing apparatus according to claim 3, the instructions further including an instruction setting a network setting based on a response to the DHCP request,
   wherein, in a case where the response to the DHCP request sent via the second network interface includes optional parameters not used in the second network interface, the optional parameters not used in the second network interface are not set as the network setting.

5. The information processing apparatus according to claim 3, further comprising, other than the second network interface, one or more another network interfaces each having a more limited function than the first network interface.

6. The information processing apparatus according to claim 1, wherein the information processing apparatus is an image forming apparatus that performs image forming processing,
   wherein the image forming apparatus is not restricted from performing data communication of a specific type via the first network interface, and
   wherein the image forming apparatus is restricted from performing the data communication of the specific type via the second network interface.

7. A control method for an information processing apparatus having a first network interface and a second network interface connected to a network different from the first network interface, wherein function of a communication performed via the second network interface is more limited than that of a communication performed via the first network interface, the control method comprising:

sending a first DHCP request including at least a first type of optional parameters to a first DHCP server on a first network connected to the information processing apparatus via the first network interface; and sending a second DHCP request not including the first type of optional parameters to a second DHCP server on a second network connected to the information processing apparatus via the second network interface.

8. A computer-readable non-transitory storage medium storing a program for causing a computer to execute a control method for an information processing apparatus having a first network interface and a second network interface connected to a network different from the first network interface, wherein function of a communication performed via the second network interface is more limited than that of a communication performed via the first network interface, the control method comprising:

sending a first DHCP request including at least a first type of optional parameters to a first DHCP server on a first network connected to the information processing apparatus via the first network interface; and sending a second DHCP request not including the first type of optional parameters to a second DHCP server on a second network connected to the information processing apparatus via the second network interface.

* * * * *